C. W. HOTTMANN.
CUTTING AND MIXING MACHINE.
APPLICATION FILED FEB. 5, 1921.

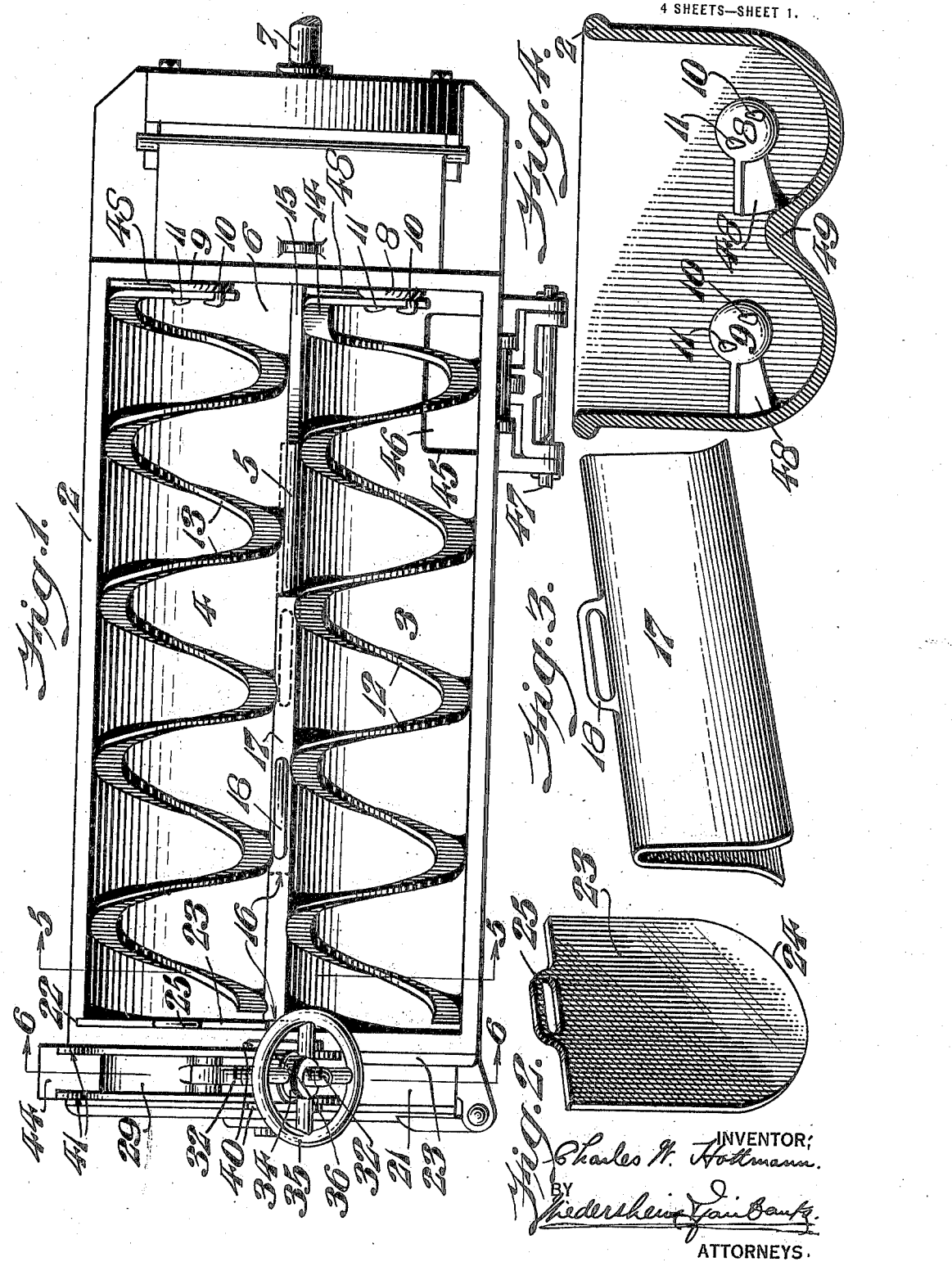

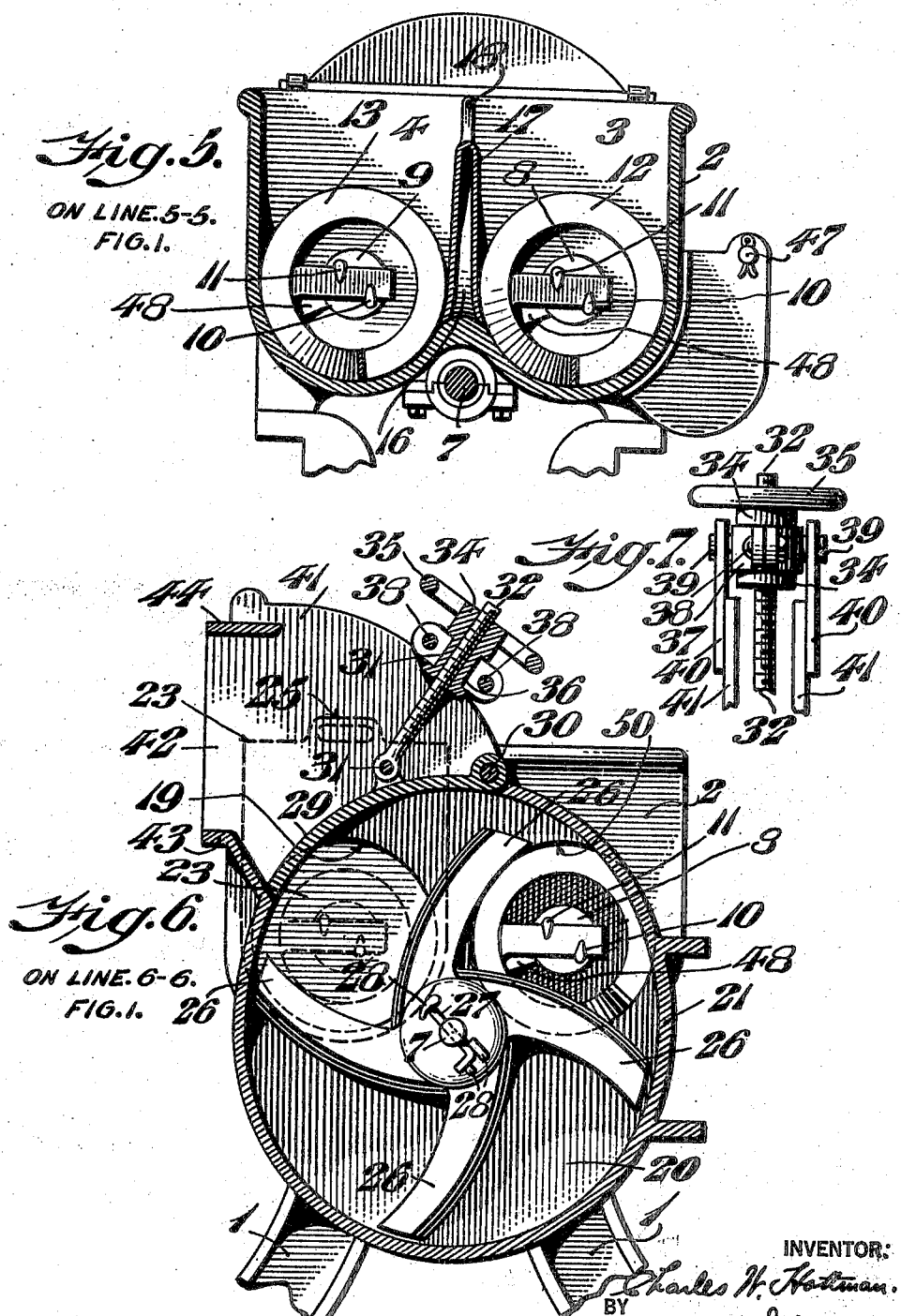

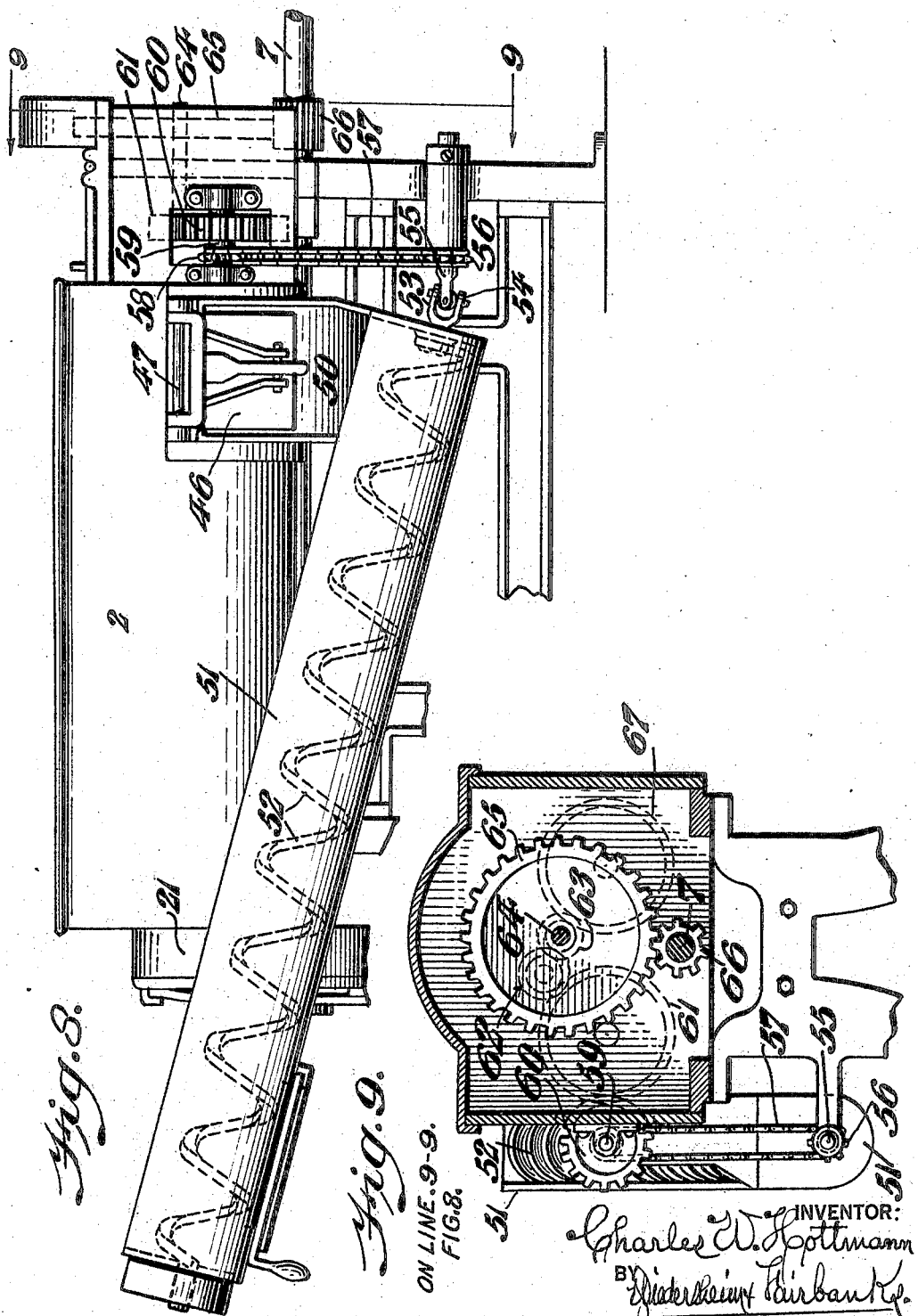

1,417,065.

Patented May 23, 1922.
4 SHEETS—SHEET 4.

INVENTOR:
Charles W. Hottmann,
BY
ATTORNEYS.

UNITED STATES PATENT OFFICE.

CHARLES W. HOTTMANN, OF PHILADELPHIA, PENNSYLVANIA, ASSIGNOR TO CHRISTOPHER OFFENHAUSER, OF PHILADELPHIA, PENNSYLVANIA.

CUTTING AND MIXING MACHINE.

1,417,065.    Specification of Letters Patent.    Patented May 23, 1922.

Application filed February 5, 1921. Serial No. 442,601.

*To all whom it may concern:*

Be it known that I, CHARLES W. HOTTMANN, a citizen of the United States, residing in the city and county of Philadelphia, State of Pennsylvania, have invented a new and useful Cutting and Mixing Machine, of which the following is a specification.

My present invention relates to a novel construction and arrangement of a cutting and mixing machine in which the feeding and cutting of the material is effected in a similar manner to that described and broadly claimed in my prior Patents No. 1,017,213, patented February 13, 1912, and No. 1,237,907, patented August 21, 1917.

In a machine of this character it is advantageous to have the machine constructed in such a manner that when it is desired to mix the seasoning with the material or to mix different materials together, to have such mixing action take place without the materials or material passing into contact with the cutting mechanism.

For example, in certain kinds of sausage, it is desirable to have the main portion of the sausage meat cut to a desired degree of fineness and thereafter to mix with it larger pieces of meat, such as for example, ham, in order to impart to the sausage when cut a more attractive appearance.

One of the primary objects of my present invention is to devise a novel construction of a cutting and mixing machine, wherein a conveying or feed channel leading to the cutting mechanism can be cut off from communication with the cutting chamber when it is desired to mix the material without cutting it.

Another primary object of my invention is to devise a novel construction and arrangement of discharge mechanism whereby the cutting mechanism will automatically discharge the finished material from the machine.

Another object of my invention is to devise novel means to prevent the upward movement of the forward ends of the feed screws since they are only supported at their rear ends at which point they are driven.

Another object of my invention is to devise novel means to elevate the discharged material in order to eliminate the necessity of a workman lifting the material, and for this purpose, I provide an elevating chute by means of which the cut and mixed material can be automatically discharged to other machines or mechanism.

With the above in view, my invention comprehends in its broad and generic scope a novel construction and arrangement of a cutting and mixing machine wherein provision is made for preventing the material passing to the cutting mechanism when it is desired to only mix the material or materials together, and wherein novel means are employed to effect the discharge of the finished material from the machine.

My invention further comprehends a novel construction and arrangement of a casing, a novel construction and arrangement of means to control the passage of the material from one feed channel to the other and from one feed channel to the cutting chamber of the cutting mechanism, and a novel construction and arrangement of an outlet which is in valve controlled communication with the cutting chamber.

My invention further comprehends a novel construction of means to prevent undue upward movement of the feed conveyors at their forward end, or of the material being fed.

It further comprehends novel means for automatically elevating the cut and mixed material or the mixed material which has been discharged from a feed channel.

Other novel features of construction and advantage will hereinafter more clearly appear in the detailed description of the invention.

For the purpose of illustrating my invention, I have shown in the accompanying drawings a typical embodiment of it which is at present preferred by me, since it has been found in practice to give satisfactory and reliable results. It is, however, to be understood that this embodiment is typical only and that the various instrumentalities of which my invention consists can be variously arranged and organized, and that my invention is not limited to the precise arrangement and organization of these instrumentalities as herein set forth.

Figure 1 represents a top plan view of a cutting and mixing machine embodying my invention.

Figure 2 represents, in perspective, one of the valves employed.

Figure 3 represents in perspective another valve employed.

Figure 4 represents in transverse section another embodiment of casing which can be employed if desired.

Figure 5 represents a section on line 5—5 of Figure 1.

Figure 6 represents a section on line 6—6 of Figure 1.

Figure 7 represents in elevation a portion of the valve controlling mechanism seen in Figure 1.

Figure 8 represents, in side elevation, my novel machine, showing more clearly the automatic elevating mechanism.

Figure 9 represents a section on line 9—9 of Figure 8.

Similar numerals of reference indicate corresponding parts.

Figure 10:
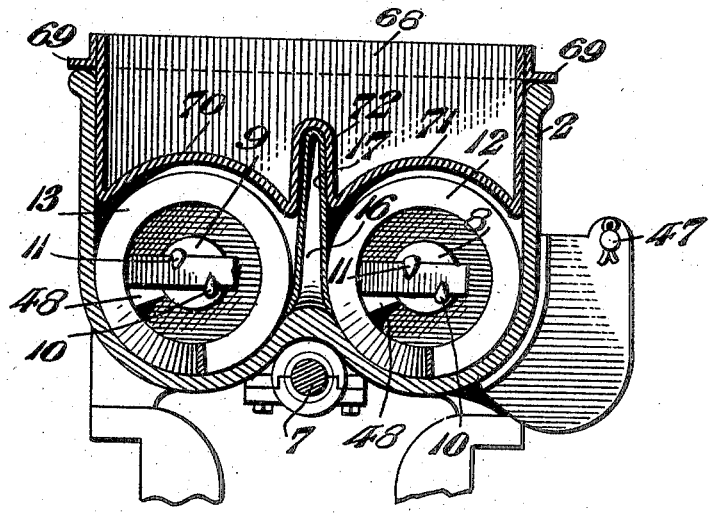
Figure 10 represents a section taken substantially on line 5—5 of Figure 1, certain parts being removed for the sake of clearness of illustration.

Referring to the drawings.

For the purpose of clearness of illustration, I have only shown the elevating mechanism and its adjuncts in connection with Figure 8 and the gearing is shown in connection with Figure 9.

1 designates the supporting framework of a cutting and mixing machine embodying my invention. The framework 1 supports a casing 2, which is ordinarily constructed from a casting and is provided with a feed channel 3 and with a feed channel 4 which are disposed in substantial parallelism with each other as illustrated and are separated from each other by means of a rib 5, which is projected upwardly between the feed channels 3 and 4 and extends longitudinally of the mixing chamber 6, which latter is formed by the feed channels 3 and 4.

The driving mechanism is the same as that disclosed in my prior patent aforesaid No. 1,237,907, and includes a shaft 7 which is driven in any desired manner and is operatively connected by means of gearing with the boss 8 to cause it to rotate in a clockwise direction and with a boss 9 to cause the latter to rotate in a contra clockwise direction. Each of the bosses 8 and 9, respectively, are provided with the oppositely extended hooks 10 and 11, respectively, which provide means for detachably connecting with their respective shafts the inturned ends of the hollow spiral conveyor blades 12 and 13. The blade 12 is positioned in the feed channel 3 and causes the rearward feed of the material and it is also provided with a more or less straight portion 14 which causes the material to feed from the rear end of the feed channel 3 through the opening or port 15 into the rear end of the feed channel 4.

The conveyor blade 13 is positioned in the feed channel 4 and causes the material to be fed forwardly in such feed channel. It will be seen that each conveyor blade is driven from its rear end and that the feed channel in which it rotates is of substantially U-shaped formation. The rib 5 terminates at a desired distance from the forward end of the mixing chamber 6 in order to form a port or opening 16 which is controlled by means of a valve 17, preferably formed from an integral piece of material, having a handle 18 for manipulating it and provided with downwardly diverging sides which are flared at their free ends in order to closely engage the rib 5 and form a portion of the walls of the feed channels. The feed channel 4 communicates by means of a port 19 with the cutting chamber 20 formed in the casing 21 which is secured to the casing 2 in any desired or conventional manner. The casing 2 is provided with the guide slots 22 to receive the valve 23 the bottom of which is rounded as at 24 in order to make close contact with the curved bottom of the feed channel 4. This valve 23 is provided with a grasping portion 25 and controls the port 19 leading from the feed channel 4 to the cutting chamber 20.

The shaft 7 does not extend into the mixing chamber 6 but extends longitudinally beneath the casing 2 as will be understood by reference to Figure 5 and this shaft 7 extends into the cutting chamber 20 as will be understood by reference to Figure 6. The cutting knives 26 are assembled with respect to the shaft 7 in a similar manner to that clearly set forth in my prior Patent No. 1,237,097, and as the manner of assembling the knives with respect to the shaft forms no part, per se, of the present invention, a detailed description is deemed to be unnecessary, it being seen from Figure 6 that they are retained in position by means of a key 27 co-operating with the stops 28. A portion of the peripheral wall of the cutting chamber 20 forms a valve 29 which is hinged at 30 and has pivotally connected to it at 31 a threaded valve stem 32 which is in threaded engagement with a nut 34 having a handle 35 in order to adapt it to be manually actuated. The nut 34 is grooved as at 36 in order to receive a split band 37 the free ends of which are deflected in order to adapt them to receive a fastening device 38. The band 37 is provided with trunnions 39 mounted in the arms 40 which are connected in any desired manner to the walls 41 of the discharge opening 42. The discharge opening 42 is formed by the side walls 41, the lower wall 43 and the top wall 44 and when the valve 29 is opened it can be brought flush with the top wall 44 in order to form the top wall of the delivery opening 42. The feed channel 3 is preferably provided at its rear end with a discharge opening 45 which is controlled by means of a door 46 pivotally supported at 47 and provided with any desired or conventional means to retain it in its closed or in its open position. If desired one or both of the bosses 8 can be provided with the scraping blade 48 to prevent the material from adhering to the rear wall of one or both feed channels. In the embodiment seen in Figure 4, the construction is the same as that already described except that the rib 5, seen in Figure 1, is cut away so that it terminates as indicated at 49, and the upper portions of the feed channel are in communication with each other. Owing, however, to the novel manner in which the conveyor blades feed the material, the circulation of the material is effected in substantially the same manner whether or not the rib 5 is employed.

If the machine simply cuts and mixes the material and discharges it through the discharge opening 46 a considerable amount of labor is necessary to lift the buckets or tubs into which the material is discharged and empty them into other machines for the further treatment of the material. I therefore preferably provide an automatic elevating mechanism so that the cut and mixed material will be discharged at a desired height from the floor. The discharge opening 45 communicates with a spout 50 which is integral with or connected to an upwardly inclined casing 51 supported in any desired manner and preferably having its top closed. Within this conveyor casing 51 is a spiral conveyor 52 journalled in a suitable bearing at its upper end and detachably connected to a rotatable member 53 in a manner similar to that in which the feed screws 12 and 13 are connected with their driving elements, the member 53 being connected by means of a universal joint 54 with a shaft 55 suitably journalled in the machine frame. This shaft 55 carries a sprocket wheel 56 around which passes a sprocket chain 57 which latter also passes around a sprocket wheel 58 mounted on a shaft 59 which latter also carries a gear 60 which is driven from a gear 61, see Figure 9, the gear 61 meshing with an idler 62 which is driven by a pinion 63 on a shaft 64 which latter carries a gear 65 which meshes with a driving pinion 66 on the driving shaft 7. The gear 61 drives the feed screw 12 and a gear 67 which is driven from the pinion 63 drives the feed screw 13.

Figure 11:
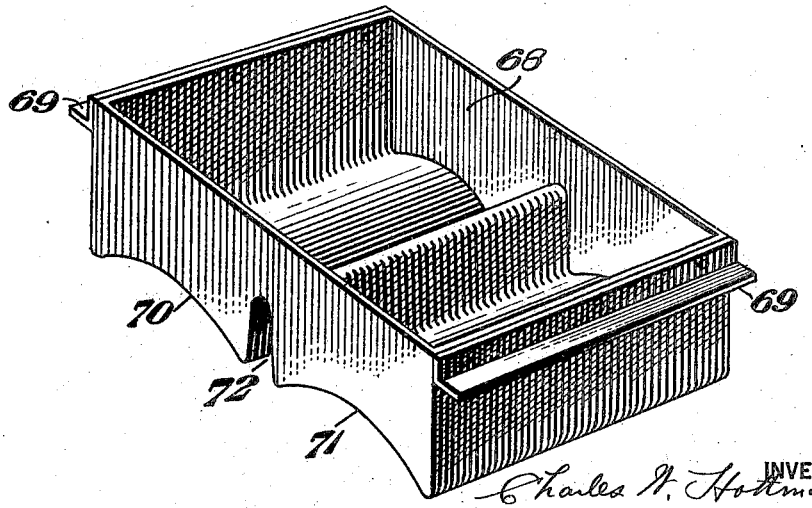
Figure 11 represents, in perspective, a member seen in Figure 10.

In some cases it is advantageous to employ a counterweight 68, see more particularly Figures 10 and 11, in order to prevent any upward movement of the forward end of the feed screws and to prevent any upward movement of the material which is being fed at such location. This counterweight 68 consists of a pan shaped member of rectangular formation as to its side walls and having angles 69 secured to its side walls adapted to rest on the side walls of the casing 2. The bottom wall of the casing is curved, as indicated at 70 and 71, and is upwardly deflected as at 72, in order that it will fit over the rib 5, as will be understood by reference to Figure 10. It will be seen that this counterweight acts as a gravity member to prevent the upward lifting of the material at the forward ends of the feed channel.

The operation of my novel construction of cutting and mixing machine will now be readily apparent to those skilled in this art and is as follows:—

If the machine is to be used for mixing and cutting the material, the valve 17 is moved forwardly to cover the port 16. Assuming now that the machine is in operation and the conveyor blades and cutting knives are revolving in the manner hereinbefore explained and the valve 29 and the door or gate 46 are closed, the material to be mixed is placed in the machine. The conveyor blade 12 feeds the material rearwardly in the feed channel 3 and the portion 14 of the conveyor blade 12 assists in feeding the material through the opening 15 to the feed channel 4 wherein the conveyor blade 15 feeds the material forwardly. The material passes through the port 19 into the cutting chamber 20 in which it is cut by the revolving knives 26, and these knives also effect the feed of the material to cutting chamber 20 through the opening 50 into the feed channel 3 in which it is fed rearwardly as hereinbefore explained.

It will thus be understood that the continuous circulation of the material through the mixing and cutting chambers is effected. As soon as the material has been reduced to the desired degree of fineness the handle 35 is actuated to open the valve 29 and the action of the knives 26 causes the material to be discharged from the cutting chamber 20 through the discharge port 42. If it is desired to discharge the material without passing it through the cutting chamber the door 46 is opened and the material will be discharged through the discharge opening 45.

In some cases, after the sausage has been reduced to the desired degree of fineness, it is customary to mix with it larger pieces and it will be apparent that if the material was passed through the cutting chamber it will be cut still finer as well as the larger pieces of the material which have been placed in the machine. I therefore provide a valve 23 so that after the materials have been reduced to a desired degree of fineness, the valve 23 is inserted to close the port 19, so that the materials which are being mixed will circulate in the mixing chamber 6. As soon as the materials are properly mixed, the door 46 is opened and the finished material is discharged through the port 45.

It will of course be apparent that the machine may be used for mixing purposes only, in which case it is only necessary to close the port 19 and place the materials to be mixed in the mixing chamber, and let the machine run for a desired length of time.

If desired, the port 45 may be omitted, and it is not necessary in all cases to employ it. The valve 29 can be opened or closed as desired by proper actuation of the hand wheel 35.

It will be apparent that if the door 46 is open the material will be discharged into the elevating casing 51 and will be carried up and discharged at the upper end of the casing, through the valve controlled opening 73.

It will now be apparent that I have devised a novel and useful construction of a cutting and mixing machine which embodies the features of advantage enumerated as desirable in the statement of the invention and the above description and while I have, in the present instance, shown and described a preferred embodiment thereof which will give in practice satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:

1. In a cutting and mixing machine, a casing having a cutting chamber and a plurality of feed channels located side by side communicating with each other and with said chamber, cutting mechanism in said chamber, conveyor means in said feed channels to feed the material to and from said chamber and from one feed channel to the other, means to close the communication from one feed channel to the cutting chamber, and actuating devices for said conveyor means and said cutting mechanism.

2. In a cutting and mixing machine, a casing having a cutting chamber and a plurality of feed channels located side by side communicating with each other and with said chamber, a valve controlling the communication between said feed channels at one of their ends, cutting mechanism in said chamber, conveyor means in said feed channels to feed the material to and from said chamber and from one feed channel to the other, means to close the communication from one feed channel to the cutting chamber, and actuating devices for said conveyor means and said cutting mechanism.

3. In a cutting and mixing machine, a casing having a plurality of feed channels located side by side with a rib between them of such length as to form an opening at the rear and at the front end of such channels, a valve mounted on said rib and controlling one of said openings, there being a cutting chamber communicating with said feed channels, means to control the passage of material from one of the feed channels into said cutting chamber, conveyors in said feed channels, cutting mechanism in the cutting chamber, and actuating means for the conveyors and the cutting mechanism.

4. In a cutting and mixing machine, a casing having a cutting chamber with a portion of its peripheral wall forming a valve, controlling discharge from said chamber, means to actuate said valve, and cutting mechanism in said cutting chamber.

5. In a cutting and mixing machine, a casing having a discharge opening and provided with a cutting chamber and having a discharge opening provided with side walls and a top and bottom wall, a portion of the wall of the cutting chamber being hinged to form a valve controlling the discharge opening, a valve stem for said valve, and an actuating nut for said valve stem, said nut being rotatably mounted.

6. A cutting machine, which comprises in combination, a casing formed with two parallel feed channels communicating with each other, a hollow spiral conveying blade in each of said channels, a mechanism for imparting reverse rotation to said conveying blades, a scraping member at one end of each feed channel and actuated by said mechanism, said casing having a cutting chamber into which the feed channels open, and rotary cutting blades within said cutting chamber.

7. A machine of the character described, comprising a casing having two parallelly disposed feed channels intercommunicating at each end, a hollow spiral conveyor blade in each of said channels, actuating means for said conveyor blades, and a valve to prevent the feed of material from one feed channel to the other feed channel.

8. A machine of the character described, comprising a casing having two feed channels disposed side by side and intercommunicating and provided with an upwardly directed conveyor casing in valve controlled communication with one of said feed channels, means to effect the circulation of the material in said feed channels, conveyor mechanism in said conveyor casing and driving mechanism common to said circulating means and conveyor mechanism.

9. A machine of the character described, comprising a casing having two feed channels disposed side by side and intercommunicating and provided with an upwardly directed conveyor casing closed at its top portion and in valve controlled communication with one of said feed channels, means to effect the circulation of the material in said feed channels, conveyor mechanism in said conveyor casing, and driving means common to said circulating means and said conveyor mechanism.

10. A machine of the character described, comprising a casing having two feed channels disposed side by side and intercommunicating and provided with an upwardly directed conveyor casing, closed at its top portion, having a valve controlled discharged opening near its upper end and in valve controlled communication with one of said feed channels, means to effect the circulation of the material in said feed channels, conveyor mechanism in said conveyor casing, and driving mechanism common to said circulating means and conveyor mechanism.

11. A machine of the character described, having intercommunicating feed channels disposed side by side, means to effect the circulation of material in said feed channels to cause the feed of one channel to be in a different direction from the feed in the other channel, and a gravity member extending into said feed channels near their forward ends.

12. A machine of the character described, having intercommunicating feed channels disposed side by side, means in said feed channels to effect the circulation of the material therein, and a pan-shaped member extending into said feed channels and having its bottom conforming to the shape of said circulating means.

13. A machine of the character described, comprising a casing having an upwardly extending rib contributing to form intercommunicating feed channels, a conveyor in each feed channel, actuating means for said conveyors, and a gravity member having a closed bottom deflected to fit over said rib.

14. A machine of the character described, comprising a casing having an upwardly extending rib contributing to form intercommunicating feed channels, a conveyor in each feed channel, actuating means for said conveyors, and a gravity member having a closed bottom deflected to fit over said rib and having the portion which covers a feed channel of curved formation.

15. A machine of the character described, comprising a casing having an upwardly extending rib contributing to form intercommunicating feed channels, a conveyor in each feed channel, actuating means for said conveyors, and a gravity member having a closed bottom deflected to fit over said rib and having means to support it on said casing.

CHARLES W. HOTTMANN.

Witnesses:
H. S. FAIRBANKS,
F. A. NEWTON.